United States Patent
Fujita

(10) Patent No.: US 7,794,631 B2
(45) Date of Patent: Sep. 14, 2010

(54) THERMOCHROMIC COLORING COLOR-MEMORY COMPOSITION AND THERMOCHROMIC COLORING COLOR-MEMORY MICROCAPSULE PIGMENT CONTAINING THE SAME

(75) Inventor: Katsuyuki Fujita, Nagoya (JP)

(73) Assignee: The Pilot Ink Co., Ltd., Aichi (JP)

( * ) Notice: Subject to any disclaimer, the term of this patent is extended or adjusted under 35 U.S.C. 154(b) by 1090 days.

(21) Appl. No.: 10/845,128

(22) Filed: May 14, 2004

(65) Prior Publication Data

US 2004/0229754 A1    Nov. 18, 2004

(30) Foreign Application Priority Data

May 16, 2003  (JP) ............... P. 2003-138990
Sep. 10, 2003  (JP) ............... P. 2003-319039

(51) Int. Cl.
*F21V 9/08*    (2006.01)
*G02F 1/361*    (2006.01)

(52) U.S. Cl. .............. 252/586; 252/582; 252/583

(58) Field of Classification Search ............ 252/583, 252/586
See application file for complete search history.

(56) References Cited

U.S. PATENT DOCUMENTS

| | | | | |
|---|---|---|---|---|
| 1,931,842 A | * | 10/1933 | Godek | ............... 401/151 |
| 4,459,059 A | * | 7/1984 | Greenspan | ............ 401/117 |
| 4,720,301 A | | 1/1988 | Kito et al. | |
| 5,281,570 A | * | 1/1994 | Hasegawa et al. | ....... 503/216 |
| 5,490,956 A | * | 2/1996 | Kito et al. | ............... 252/583 |
| 5,558,699 A | * | 9/1996 | Nakashima et al. | ... 106/31.16 |
| 5,879,443 A | * | 3/1999 | Senga et al. | ............ 106/498 |

FOREIGN PATENT DOCUMENTS

JP        3-99036        *        4/1991

* cited by examiner

*Primary Examiner*—T. J. Kugel
(74) *Attorney, Agent, or Firm*—Sughrue Mion, PLLC

(57) ABSTRACT

A thermochromic coloring color-memory composition which comprises a homogeneous solubilized mixture of (A) an electron donative coloring organic compound, (B) an electron accepting compound and (C) an ester compound represented by the specific formula as a reaction medium which controls color reactions of the components (A) and (B).

7 Claims, 1 Drawing Sheet

THERMOCHROMIC COLORING COLOR-MEMORY COMPOSITION AND THERMOCHROMIC COLORING COLOR-MEMORY MICROCAPSULE PIGMENT CONTAINING THE SAME

FIELD OF THE INVENTION

This invention relates to a thermochromic coloring color-memory composition and a thermochromic coloring color-memory microcapsule pigment containing the same. More illustratively, it relates to a thermochromic coloring color-memory composition which displays reversible discoloration between coloring and decoloring by showing a large hysteresis characteristic based on a change in temperature and keeps either of the colored state and decolored state alternately and reversibly even after removal of application of the heat or cold required for the discoloration, and to a thermochromic coloring color-memory microcapsule pigment containing the same.

BACKGROUND ART

Regarding such a type of thermochromic coloring color-memory material, the applicant has already proposed (for example, see Patent Reference 1).

In a conventional reversible thermal discoloration material, it discolors bordering before and after a discoloration temperature, only one specified state of both states before and after discoloration exists at the ordinary temperature region, and the other state is maintained while a heat or cold necessary for expressing the state is applied but returns to the state of ordinary temperature region when application of the heat or cold is removed, but in comparison with such a type, the aforementioned thermochromic coloring color-memory material can selectively maintain either of the color of lower side than the discoloration temperature and the color of higher side than that, at the ordinary temperature region and can alternately maintain the color by applying a heat or cold as occasion demands, so that it has been applied to various fields such as the fields of thermo-sensitive recording materials, toys, ornaments and printing. [Patent Reference 1] U.S. Pat. No. 4,720,301

SUMMARY OF THE INVENTION

As is disclosed in the aforementioned U.S. Pat. No. 4,720,301, such a kind of color-memorizing effect is expressed only in a system to which, among compounds selected from esters that control the color reaction, a specified compound is applied as a constituting component.

The invention contemplates further searching for compounds which can be used as a reaction medium for expressing the aforementioned color-memorizing effect and thereby improving degree of freedom for the selection of reaction medium and further increasing availability of such a kind of thermochromic coloring color-memory material.

The present inventors have accomplished the invention by finding that a thermal discoloration characteristic having a large maximum hysteresis width (ΔH) is exerted and an effective color-memorizing effect is expressed in a system to which an ester compound comprising an alcohol compound having 2 aromatic rings in the molecule and a saturated or unsaturated fatty acid having 4 or mote carbon atoms is applied as the reaction medium of color reaction.

A requirement of the invention is a thermochromic coloring color-memory composition which comprises a homogeneous solubilized mixture of (A) an electron donative coloring organic compound, (B) an electron accepting compound and (C) an ester compound represented by the following formula (1) as a reaction medium which controls color reactions of the aforementioned (A) and (B).

(1)

In the formula, R represents an alkyl group or alkenyl group, having 4 or more carbon atoms.

Its another requirement is that the aforementioned (B) electron accepting compound is a compound which has at least 3 or more benzene rings and also has a phenolic hydroxyl group and has a molecular weight of 250 or more, or a compound which has the phenolic hydroxyl group, represented by the following formula (2).

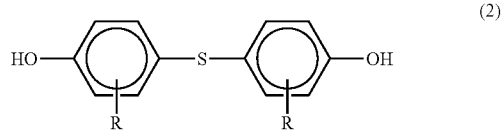

(2)

In the formula, R represents an alkyl group having from 1 to 8 carbon atoms.

Its another requirement is that the present composition has a color-memory ability at the ordinary temperature range, wherein it shows a maximum hysteresis width (ΔH) of from 40° C. to 70° C. regarding a color density-temperature curve, and the complete decoloring temperature ($T_4$) is 40° C. or higher and the coloring starting temperature ($T_2$) is 20° C. or lower regarding the color density-temperature curve.

Still another requirement is a thermochromic coloring color-memory microcapsule pigment which comprises the aforementioned thermochromic coloring color-memory composition.

Based on the use of an ester compound comprising an alcohol compound having 2 aromatic rings in the molecule and a saturated or unsaturated fatty acid having 4 or more carbon atoms, the invention can generate reversible discoloration of coloring and decoloring showing a broad maximum hysteresis width (ΔH) regarding a color density-temperature curve, can alternately memorize and keep both of the color of low temperature side and the color of high temperature side compared to the discoloration temperature, and can effectively express a characteristic in that either of the colors can be reversibly reproduced, memorized and maintained by applying a heat or cold as occasion demands, so that it renders possible provision of a thermochromic coloring color-memory composition and a thermochromic coloring color-memory microcapsule pigment containing the same, which, in comparison with the conventional ester compound-formulated system, are rich in practicality and have the applicability to various fields such as of heat sensitive materials, ornaments, toys and training elements.

In Figs., sign $T_1$ is a complete coloring temperature, sign $T_2$ is a coloring starting temperature, sign $T_3$ is a decoloring starting temperature, sign $T_4$ is a complete decoloring temperature, sign $\Delta H$ is a maximum hysteresis width.

DETAILED DESCRIPTION OF THE INVENTION

Hysteresis characteristic in a color density-temperature curve of the thermochromic coloring color-memory composition of the invention is described in the following based on the graph of FIG. 1.

Figure 1:
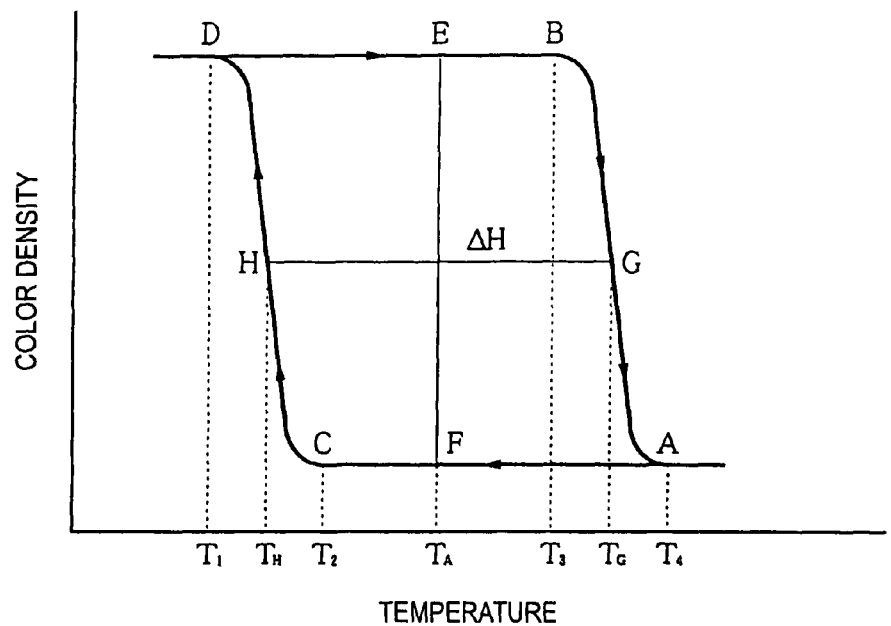
FIG. 1 is a graph describing hysteresis characteristics of the thermochromic coloring color-memory composition of the invention in color density-temperature curves.

In FIG. 1, the color density is plotted as ordinate and the temperature as abscissa. Change in the color density due to temperature change progresses along the arrow. In this case, A is a point showing the density at a minimum temperature $T_4$ which reaches a completely decolored state (to be referred to as complete decoloring temperature herein after), B is a point showing the density at a maximum temperature $T_3$ which can maintain a completely colored state (to be referred to as decoloring starting temperature herein after), C is a point showing the density at a minimum temperature $T_2$ which can maintain a completely decolored state (to be referred to as coloring starting temperature herein after), and D is a point showing the density at a maximum temperature $T_1$ which reaches a completely colored state (to be referred to as complete coloring temperature herein after).

The discoloration temperature region is a temperature region between the aforementioned $T_1$ and $T_4$, wherein two phases of the colored state and decolored state can coexist, and the temperature region between $T_2$ and $T_3$, as the region having a large difference in the color density, is a substantial discoloration temperature region (two phase retention region).

Also, length of the line segment EF is a measure showing contrast of discoloration, and length of the line segment HG is a temperature width showing the degree of hysteresis (to be referred to as maximum hysteresis width $\Delta H$ hereinafter), wherein larger $\Delta H$ value facilitates keeping of each state of before and after discoloration.

According to the tests carried out by the inventors, the $\Delta H$ value which can keep each state of before and after discoloration is within the range of from 40° C. to 70° C., preferably from 50 to 70° C., more preferably from 60 to 70° C.

Also, regarding a temperature to be subjected to the practical use in which the aforementioned two phases of colored state and decolored state are substantially maintained, namely the temperature width between $T_3$ and $T_2$ including $T_4$, a range of from 20° C. or more to less than 60° C. is effective.

In addition, in order to allow only one specified state of both states before and after discoloration to exist at the ordinary temperature range, the complete decoloring temperature ($T_4$) is 40° C. or higher, preferably 45° C. or higher and more preferably 50° C. or higher, and the coloring starting temperature ($T_2$) is 20° C. or lower, preferably 10° C. or lower and more preferably 0° C. or lower.

In this connection, a At value as the difference between $T_4$ and $T_3$, or as the difference between $T_2$ and $T_1$, is a measure for showing sharpness of the discoloration.

In addition, the ordinary temperature range indicates the temperature assumed to be experienced under usual indoor conditions.

Though the constituting component ratio of the components (A), (B) and (C) of the invention is influenced by the concentration, discoloration temperature, discoloration mode and kind of each component, the component ratio from which generally desired characteristics can be obtained is component (B) within the range of from 0.1 to 50, preferably from 0.5 to 20, and component (C) within the range of from 1 to 800, preferably from 5 to 200, based on component (A) 1 (each of the aforementioned ratios is weight part(s)).

Also, each component may be a mixture of two or more species, and additives such as an antioxidant, an ultraviolet ray absorbent, an infrared ray absorbent and a solubilizing agent can be added thereto within such a range that its function is not spoiled.

Compounds of the components (A), (B) and (C) are illustratively exemplified in the following.

As the component (A) of the invention, namely an electron donative coloring organic compound, conventionally known compounds such as diphenylmethane phthalides, phenylindolyl phthalides, indolyl phthalides, diphenylmethane azaphthalides, phenylindolyl azaphthalides, fluorans, styrylquinolines and diazarhodamine lactones can be exemplified, and examples of these compounds are shown below.

Their examples include
3,3-bis(p-dimethylaminophenyl)-6-dimethylaminophtha- lide,
3-(4-diethylamunophenyl)-3-(1-ethyl-2-methylindol-3-yl) phthalide, 3,3-bis(1-n-butyl-2-methylindol-3-yl)phthalide,
3,3-bis(2-ethoxy-4-diethylaminophenyl)-4-azaphthalide,
3-[2-ethoxy-4-(N-ethylanilino)phenyl]-3-(1-ethyl-2-methylindol-3-yl)-4-azaphthalide, 3,6-diphenylaminofluoran,
3,6-dimethoxyfluoran, 3,6-di-n-butoxyfluoran,
2-methyl-6-(N-ethyl-N-p-tolylamino)fluoran,
3-chloro-6-cyclohexylaminofluoran,
2-methyl-6-cyclohexylaminofluoran,
2-(2-chloroanilino)-6-di-n-butylaminofluoran,
2-(3-trifluoromethylanilino)-6-diethylaminofluoran,
2-(N-methylanilino)-6-(N-ethyl-N-p-tolylamino)fluoran,
1,3-dimethyl-6-diethylaminofluoran,
2-chloro-3-methyl-6-diethylaminofluoran,
2-anilino-3-methyl-6-diethylaminofluoran,
2-anilino-3-methyl-6-di-n-butylaminofluoran,
2-xylidino-3-methyl-6-diethylaminofluoran,
1,2-benz-6-diethylaminofluoran,
1,2-benz-6-(N-ethyl-N-isobutylamino)fluoran,
1,2-benz-6-(N-ethyl-N-isoamylamino)fluoran,
2-(3-methoxy-4-dodecoxystyryl)quinoline,
spiro[5H-(1)benzopyrano(2,3-d)pyrimidine-5,1'(3'H) isobenzoflran]-3'-one, 2-(diethylamino)-8-(diethylamino)-4-methyl-,
spiro[5H-(1)benzopyrano(2,3-d)pyrimidine-5,1'(3'H) isobenzoflran]-3'-one,
2-(di-n-butylamino)-8-(di-n-butylamino)-4-methyl-,
spiro[5H-(1)benzopyrano(2,3-d)pyrimidine-5,1'(3'H) isobenzoflran]-3'-one,
2-(di-n-butylamino)-8-(diethylamino)-4-methyl-,
spiro[5H-(1)benzopyrano(2,3-d)pyrimidine-5,1'(3'H) isobenzoflran]-3'-one,
2-(di-n-butylamino)-8-(N-ethyl-N-i-amylamino)-4-methyl-,
spiro[5H-(1)benzopyrano(2,3-d)pyrimidine-5,1'(3'H) isobenzoflran]-3'-one,
2-(di-n-butylamino)-8-(di-n-butylamino)-4-phenyl,
3-(2-methoxy-4-dimethylaminophenyl)-3-(1-butyl-2-methylindol-3-yl)4,5,6,7-tetrachlorophthalide,
3-(2-ethoxy-4-diethylaminophenyl)-3-(1-ethyl-2-methylindol-3-yl)-4,5,6,7-tetrachlorophthalide, and
3-(2-ethoxy-4-diethylaminophenyl)-3-(1-pentyl-2-methylindo 1-3-yl)-4,5,6,7-tetrachlorophthalide.

Also can be exemplified are pyridine, quinazoline and bis-quinazoline compounds which are effective in expressing development of fluorescent yellow to red colors.

As the electron accepting compound of component (B), a group of compounds which have active proton, a group of pseudo-acidic compounds (a group of compounds which are not acid but cause color development of the component (A) by acting as acid in the composition) and a group of compounds which have electron voids can be cited.

Examples of the compound having active proton as compounds having phenolic hydroxyl group include from monophenols to polyphenols, their derivatives which have substituent groups such as alkyl group, aryl group, acyl group, alkoxycarbonyl group, carboxy group, esters thereof, amido group and halogen group, and phenol-aldehyde condensed resins such as of bis type and tris type phenols.

In addition, they may also be metal salts of the aforementioned compounds having phenolic hydroxyl group.

Illustrative examples are listed below.

Phenol, o-cresol, tertiary butylcatechol, nonylphenol, n-octylphenol, n-dodecylphenol, n-stearylphenol, p-chlorophenol, p-bromophenol, o-phenylphenol, n-butyl p-hydroxybenzoate, n-octyl p-hydroxybenzoate, resorcin, dodecyl gallate, 2,2-bis(4'-hydroxyphenyl)propane, 4,4-dihydroxydiphenylsulfone, 1,1-bis(4'-hydroxyphenyl) ethane, 2,2-bis(4'-hydroxy-3-methylphenyl)propane, bis(4-hydroxyphenyl) sulfide, 1-phenyl-1,1-bis(4'-hydroxyphenyl) ethane, 1,1-bis(4'-hydroxyphenyl)-3-methylbutane, 1,1-bis (4'-hydroxyphenyl)-2-methylpropane, 1,1-bis (4'-hydroxyphenyl)-n-hexane, 1,1-bis(4'-hydroxyphenyl)-n-heptane, 1,1-bis(4'-hydroxyphenyl)-n-octane, 1,1-bis(4'-hydroxyphenyl)-n-nonane, 1,1-bis(4'-hydroxyphenyl)-n-decane, 1,1-bis (4'-hydroxyphenyl)-n-dodecane, 2,2-bis(4'-hydroxyphenyl) butane, 2,2-bis(4'-hydroxyphenyl)ethyl propionate, 2,2-bis (4'-hydroxyphenyl)-4-methylpentane, 2,2-bis(4'-hydroxyphenyl)hexafluoropropane, 2,2-bis(4'-hydroxyphenyl)-n-heptane and 2,2-bis(4'-hydroxyphenyl)-n-nonane.

Figure 2:
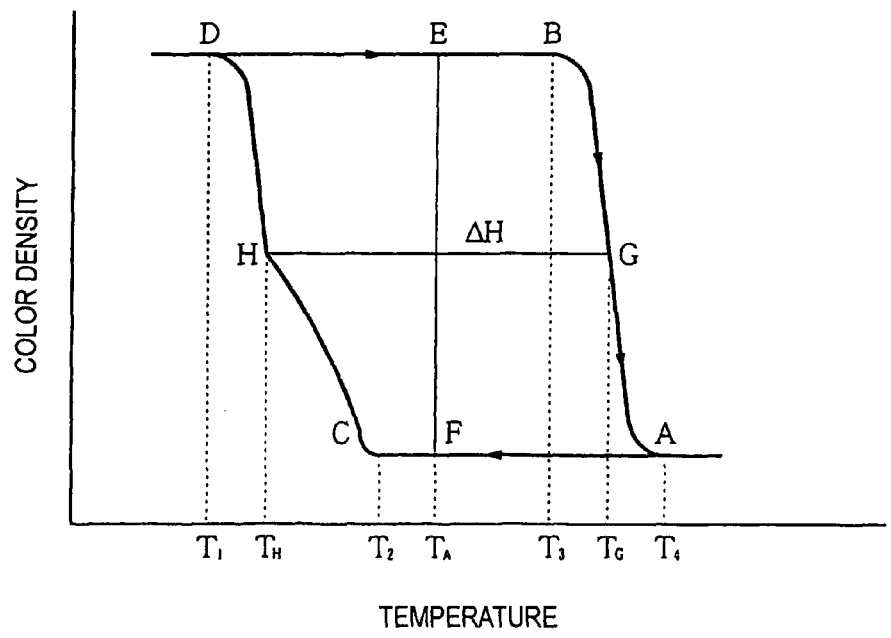
FIG. 2 is a graph describing hysteresis characteristics of the thermochromic coloring color-memory composition of the invention in color density-temperature curves.

In this connection, discoloration sensitivity in changing from a decolored state to a colored state can be sharpened when a compound having at least 3 benzene rings and also having a molecular weight of 250 or more, preferably from 250 to 500, or the phenolic hydroxyl group-containing compound represented by the formula (2) is used as the aforementioned compound having phenolic hydroxyl group. Illustratively, in the discoloration behavior when the temperature showing a completely decolored state ($T_4$) reaches the temperature showing a completely colored state ($T_1$) via the temperature at which color development starts ($T_2$) as shown in FIG. 2, the temperature at which color development starts ($T_2$) does not show a behavior of shifting to the high temperature side and thereby gradually developing color, but temperature difference between the temperature at which color development starts ($T_2$) and the temperature showing a completely colored state ($T_1$) becomes small as shown in FIG. 1, so that it becomes apt to show the behavior of sharply changing from the decolored state to the colored state.

Examples of the aforementioned compound having at least 3 benzene rings and also having a molecular weight of 250 or more include 4,4',4"-methylidenetrisphenol,
2,6-bis[(2-hydroxy-5-methylphenol)methyl]-4-methylphenol,
4,4'-[1-[4-[1-(4-hydroxyphenyl)-1-methylethyl]phenyl]ethylidene]bisphenol,
4,4',4"-methylidenetris[2-methylphenol],
4,4'-[(2-hydroxyphenyl)methylene]bis[2,3,6-triphenyl-phenol],
2,2-methylenebis[6-[(2-hydroxy-5-methylphenyl)methyl]-4-methylphenol],
2,4,6-tris(4-hydroxyphenylmethyl)1,3-benzenediol,
4,4',4"-ethylidenetrisphenol,
4,4'-[(4-hydroxyphenyl)methylene]bis[2-methylphenol],
4,4-[(4-hydroxyphenyl)methylene]bis[2,6-dimethylphenol],
4,4'-[(4-hydroxyphenyl)methylene]bis[2-methylphenol],
4,4'-[(4-hydroxyphenyl)methylene]bis[2,6-dimethylphenol],
4,4'-[(4-hydroxy-3-methoxyphenyl)methylene]bis[2,6-dimethylphenol],
2,4-bis[(5-methyl-2-hydroxyphenyl)methyl]-6-cyclohexylphenol,
4,4'-[1-[4-[1-(4-hydroxy-3-methylphenyl)-1-methylethyl]phenyl]ethylidene]bis[2-methylphenol],
4,4'-[(4-hydroxyphenyl)methylene]bis[2-cyclohexyl-5-methylphenol],
4,6-bis[(4-hydroxyphenyl)methyl]1,3-benzenediol,
4,4'-[(3,4-dihydroxyphenyl)methylene]bis[2,6-dimethylphenol],
4,4'-(1-phenylethylidene)bisphenol,
5,5'-(1-methylethylidene)bis[1-phenyl-2-ol],
4,4',4"-methylidenetrisphenol,
4,4'-[1-[4-[1-(4-hydroxyphenyl)-1-methylethyl]phenyl]-ethylidene]bisphenol,
4,4'-(phenylmethylene)bisphenol,
4,4'-[1,4-phenylenebis(1-methylethylidene)]bis[2-methylphenol], and
5,5'-(1,1-cyclohexylidene)bis[1-biphenyl-2-ol].

Examples of the aforementioned phenolic hydroxyl group-containing compound represented by general formula (2) include bis(3-methyl-4-hydroxyphenyl)sulfide,
bis(3,5-dimethyl-4-hydroxyphenyl)sulfide,
bis(3-ethyl-4-hydroxyphenyl)sulfide,
bis(3,5-diethyl-4-hydroxyphenyl)sulfide,
bis(3-propyl-4-hydroxyphenyl)sulfide,
bis(3,5-dipropyl-4-hydroxyphenyl)sulfide,
bis(3-t-butyl-4-hydroxyphenyl)sulfide,
bis(3,5-t-butyl-4-hydroxyphenyl)sulfide,
bis(3-pentyl-4-hydroxyphenyl)sulfide,
bis(3-hexyl-4-hydroxyphenyl)sulfide,
bis(3-heptyl-4-hydroxyphenyl)sulfide and
bis(5-octyl-2-hydroxyphenyl)sulfide Though the aforementioned compound having phenolic hydroxyl group can express most effective thermal discoloration characteristics, it may be a compound selected from aromatic carboxylic acids and aliphatic carboxylic acids having from 2 to 5 carbon atoms, carboxylic acid metal salts, acidic phosphoric acid esters and metal salts thereof, 1,2,3-triazole and derivatives thereof.

Next, the ester compound of component (C) is illustratively exemplified.

The ester compound to be used in the invention is an ester compound constituted from an alcohol compound having 2 aromatic rings in the molecule and a saturated or unsaturated fatty acid, having 4 or more carbon atoms.

The R in the formula represents an alkyl group or an alkenyl group, having 4 or more carbon atoms, but is preferably an alkyl group having from 6 to 20 carbon atoms, more preferably an alkyl group having from 8 to 18 carbon atoms.

Illustrative examples of the aforementioned compound (C) include 4-benzyloxyphenylethyl butanoate, 4-benzyloxyphenylethyl pentanoate, 4-benzyloxyphenylethyl hexanoate, 4-benzyloxyphenylethyl heptanoate, 4-benzyloxyphenylethyl octanoate, 4-benzyloxyphenylethyl nonanoate, 4-benzyloxyphenylethyl decanoate, 4-benzyloxyphenylethyl undecanoate, 4-benzyloxyphenylethyl didecanoate, 4-benzyloxyphenylethyl tridecanoate, 4-benzyloxyphenylethyl tetradecanoate, 4-benzyloxyphenylethyl pentadecanoate, 4-benzyloxyphenylethyl hexadecanoate, 4-benzyloxyphenylethyl heptadecanoate, 4-benzyloxyphenylethyl octadecanoate, 4-benzyloxyphenylethyl nonadecanoate, 4-benzyloxyphenylethyl eicosanoate, 4-benzyloxyphenylethyl tricosanoate, 4-benzyloxyphenylethyl tetracosanoate, 4-benzyloxyphenylethyl pentacosanoate, 4-benzyloxyphenylethyl hexacosanoate, 4-benzyloxyphenylethyl heptacosanoate, 4-benzyloxyphenylethyl octacosanoate, 4-benzyloxyphenylethyl nonacosanoate, 4-benzyloxyphenylethyl triacontanoate and 4-benzyloxyphenylethyl hentriacontanoate.

In addition, among the compounds mentioned as examples, particularly preferable ones are those enumerated below and having an alkyl group with 8 to 14 carbon atoms: 4-benzyloxyphenylethyl octanoate, 4-benzyloxyphenylethyl nonanoate, 4-benzyloxyphenylethyl decanoate, 4-benzyloxyphenylethyl undecanoate, 4-benzyloxyphenylethyl dodecanoate, 4-benzyloxyphenylethyl tridecanoate, 4-benzyloxyphenylethyl tetradecanoate.

Since the aforementioned ester compounds can provide a broad maximum hysteresis width similar to or larger than the case of the use of the ester compounds used in the conventional thermochromic coloring color-memory materials, they are rich in practicality and have excellent applicability to various applications.

Though the component (C) of the invention uses the aforementioned ester compound, additives such as other esters, alcohols, carboxylic acids, ketones and amides can be added thereto as occasion demands, within such a range that the hysteresis characteristic is not largely changed. In that case, it is desirable to add them in an amount of 20 or less (parts by weight) based on 100 of the ester of the invention, for effectively expressing the intended color-memorizing effect.

A homogeneous solubilized mixture indicates the state that components (A), (B) and (C) are homogeneously mixed together.

The homogeneous solubilized mixture is obtained by, after mixing components (A), (B) and (C), dissolving components (A) and (B) in component (C).

The homogenous solubilized mixture comprising the aforementioned three components can form a thermochromic coloring color-memory microcapsule pigment by including the mixture in microcapsules.

The aforementioned microcapsules satisfy the practicality when their average particle diameter is within the range of from 0.5 to 50 μm, preferably from 1 to 30 μm, more preferably from 1 to 20 μm.

When the aforementioned microcapsules are a system in which average value of the maximum outer diameter exceeds 50 μm, they lack in dispersion stability and processing suitability in blending in inks, paints or resins.

On the other hand, in the case of a system in which average value of the maximum outer diameter is 0.5 μm or less, high density coloring can hardly be obtained.

In addition, the aforementioned microcapsules are effective within the range of inclusion body/wall membrane=7/1 to 1/1 (weight ratio), and since reduction of color density and clearness at the time of color development cannot be avoided when the ratio of inclusion body becomes larger than the aforementioned range, it is preferably inclusion body/wall membrane=6/1 to 1/1 (weight ratio).

Examples of the microencapsulation method include conventionally known isocyanate system interfacial polymerization, in situ polymerization such as of melamine-formalin system, submerged coat hardening, phase separation from aqueous solution, phase separation from organic solvent, melt dispersion cooling, air suspension coating and spray drying, which can be optionally selected in response to the object. In addition, the microcapsules can be subjected to practical use by further giving durability and modifying surface characteristics in response to the object through the arrangement of a secondary resin coating on the surface.

In this connection, a discoloration behavior from a color (1) to a color (2) can be effected by formulating the aforementioned thermochromic coloring color-memory composition or thermochromic coloring color-memory microcapsule pigment containing the same with a general dyestuff or pigment (non-thermal discoloration type).

The aforementioned thermochromic coloring color-memory composition or thermochromic coloring color-memory microcapsule pigment containing the same can be used as a thermochromic coloring color-memory liquid composition by dispersing in a vehicle containing various additive agents as occasion demands, for such applications as a printing ink to be used in screen printing, offset printing, process printing, gravure printing, coater or pad application, a paint to be used in brush coating, spray coating, electrostatic coating, electro-deposition coating, flow coating, roller coating or dip coating, an ink for ink jet use, an ink for use in writing or coating implements such as marking pen, ball-point pen, fountain pen and writing brush pen, and a coloring liquid for use in crayon, colors, cosmetics or fibers.

In this connection, the material of the aforementioned support is not limited and every material is effective, and its examples include paper, synthetic paper, fiber, cloth, synthetic leather, leather, plastics, glass, pottery materials, metals, wood and stone, which may be not only in flat shape but also in irregular form.

In case that a non-thermal discoloration coloring layer (including an image) is formed in advance on the aforementioned support, the aforementioned coloring layer can be in-visualized by a temperature change, so that the changing mode can be further varied.

In addition, the aforementioned thermochromic coloring color-memory composition or thermochromic coloring color-memory microcapsule pigment containing the same can be used as a resin composition for thermochromic coloring color-memory molding as a form of pellet, powder or paste, by melt-blending with a thermoplastic resin, a thermosetting resin or a wax.

Various shapes of moldings such as three-dimensional moldings of optional shapes, films, sheets, plates, filaments, rods or pipes can be obtained using the aforementioned resin for molding use, by means of injection molding, extrusion molding, blow molding or cast molding.

Examples of the aforementioned additive agent include a crosslinking agent, a curing agent, a desiccating agent, a plasticizer, a viscosity adjusting agent, a dispersing agent, an ultraviolet ray absorbent, an antioxidant, light stabilizer, a sedimentation preventing agent, a lubricant, a gelling agent, an antifoaming agent, a flatting agent, a penetrating agent, a pH regulator, a foaming agent, a coupling agent, a moisture keeping agent, a fungicide, an antiseptic and an anticorrosive agent.

Light resistance of a layered product prepared by forming a reversible heat discoloring layer of the aforementioned liquid matter on a support, or a molded product thereof, can be improved by laminating thereon a layer containing a light stabilizer and/or a transparent metallic luster pigment, or durability of the same can also be improved by arranging a topcoat layer thereon.

As the aforementioned transparent metallic luster pigment, a pigment prepared by coating the surface of a core substance such as natural mica, synthetic mica, glass piece, alumina or a piece of a transparent film with a metal oxide such as titanium oxide can be exemplified.

Regarding the product prepared making use of the aforementioned thermochromic coloring color-memory composition or thermochromic coloring color-memory microcapsule pigment containing the same, its illustrative examples include doll- or animal figured toys, hair for a doll- or animal figured toy, doll accessories such as house, furniture, clothing, hat, bag and shoes for a doll, accessory toys, stuffed dolls, painting toys, picture books for toys, puzzle toys such as a jigsaw puzzle, toy bricks, block toys, clay toys, fluid toys, tops, kites, musical instrument toys, cooking toys, gun toys, capturing toys, background toys, toys imitating vehicles, animals, plants, buildings or food articles, clothes such as a T-shirt, a sweet shirt, a blouse, a dress, a bathing suit, a raincoat and a skiwear, footwear such as shoes and shoelaces, personal effects made of cloth such as a handkerchief, a towel and a wrapping cloth, interior ornaments such as a rug, a curtain, a curtain cord, a tablecloth, a carpet, a cushion, a picture frame and an imitation flower, bedding such as bedclothes, a pillow and a mattress, accessories such as a ring, a bracelet, a tiara, earrings, a hair stopper, an attaching nail, a ribbon and a scarf, stationary such as a writing tool, a stamp, an eraser, a celluloid board, a ruler and an adhesive tape, cosmetics such as a lipstick, an eye shadow, a manicure, a hair dye, an attaching nail and a paint for attaching nail, kitchen utensils such as a glass, a plate, chopsticks, a spoon, a fork, a pot and a frying pan, various printed matter such as a calendar, a label, a card, a recording material and those for forgery prevention, books such as a picture book, and gloves, a necktie, a hat, a bag, a container for packing use, embroidery thread, sporting goods, fishing goods, a toothbrush, a coaster, a watch, eyeglasses, lighting fixture, an air conditioner, a musical instrument, a pocket body warmer, a cold reserving agent, a photo stand, and bags and pouches of all kinds such as a purse, as well as an umbrella, furniture, a vehicle, a construction, a temperature detecting indicator and training goods.

EXAMPLES

Examples of the invention are shown below, but the invention is not limited thereto.

The method for producing a thermochromic coloring color-memory composition and a microcapsule pigment containing the same and the method for measuring hysteresis characteristics of a thermochromic coloring color-memory composition and a microcapsule pigment containing the same based on the change in temperature, in respective examples, are described in the following.

In this connection, the term "part(s)" in the following blending examples means part(s) by weight.

Example 1

A thermochromic coloring color-memory composition was obtained by homogeneously and solubilizly dissolving 2.0 parts of 3-(4-diethylamino-2-hexyloxyphenyl)-3-(1-ethyl-2-methyl-indol-3-yl)-4-azaphthalide as the component (A), 4.0 parts of 2,2-bis(4'-hydroxyphenyl)hexafluoropropane and 4.0 parts of 1,1-bis(4'-hydroxyphenyl)-n-decane as the component (B) and 50.0 parts of 4-benzyloxyphenylethyl caprate as the component (C).

This thermochromic coloring color-memory composition changed color from blue to colorless.

Example 2

A thermochromic coloring color-memory microcapsule pigment suspension was obtained by uniformly heat-dissolving a thermochromic coloring color-memory composition comprising 2.0 parts of 3-(4-diethylamino-2-hexyloxyphenyl)-3-(1-ethyl-2-methyl-indol-3-yl)-4-azaphthalide as the component (A), 8.0 parts of 1,1-bis(4'-hydroxyphenyl)-n-decane as the component (B) and 50.0 parts of 4-benzyloxyphenylethyl palmitate as the component (C), emulsifying and dispersing a solution prepared as a wall membrane material by mixing 30.0 parts of an aromatic polyvalent isocyanate prepolymer with 40.0 parts of a co-solvent such that microdroplets were formed in 8% polyvinyl alcohol aqueous solution, continuing the stirring at 70° C. for about 1 hour, and then adding 2.5 parts of a water-soluble aliphatic denatured amine and further continuing the stirring for 6 hours.

By isolating the pigment from the aforementioned microcapsule pigment suspension by centrifugation, a thermochromic coloring color-memory microcapsule pigment having an average particle diameter of 6 μm which changes color from blue to colorless was obtained.

Example 3

A thermochromic coloring color-memory microcapsule pigment suspension was obtained by uniformly heat-dissolving a thermochromic coloring color-memory composition comprising 2.0 parts of 3-(4-diethylamino-2-hexyloxyphenyl)-3-(1-ethyl-2-methylindol-3-yl)-4-azaphthalide as the component (A), 8.0 parts of 1,1-bis(4'-hydroxyphenyl)-n-decane as the component (B) and 50.0 parts of 4-benzyloxyphenylethyl myristate as the component (C), emulsifying and dispersing a solution prepared as a wall membrane material by mixing 30.0 parts of an aromatic polyvalent isocyanate prepolymer with 40.0 parts of a co-solvent such that microdroplets were formed in 8% polyvinyl alcohol aqueous solution, continuing the stirring at 70° C. for about 1.5 hours, and then adding 2.5 parts of a water-soluble aliphatic denatured amine and further continuing the stirring for 6 hours.

By isolating the pigment from the aforementioned microcapsule pigment suspension by centrifugation, a thermochromic coloring color-memory microcapsule pigment having an average particle diameter of 4 μm which changes color from blue to colorless was obtained.

Example 4

A thermochromic coloring color-memory microcapsule pigment suspension was obtained by uniformly heat-dissolving a thermochromic coloring color-memory composition comprising 2.0 parts of 3-(4-diethylamino-2-hexyloxyphenyl)-3-(1-ethyl-2-methylindol-3-yl)-4-azaphthalide as the component (A), 8.0 parts of 1,1-bis(4'-hydroxyphenyl)-n-decane as the component (B) and 50.0 parts of 4-benzyloxyphenylethyl laurate as the component (C), emulsifying and dispersing a solution prepared as a wall membrane material by mixing 30.0 parts of an aromatic polyvalent isocyanate prepolymer with 40.0 parts of a co-solvent such that microdroplets were formed in 8% polyvinyl alcohol aqueous solution, continuing the stirring at 70° C. for about 1 hour, and then adding 2.5 parts of a water-soluble aliphatic denatured amine and further continuing the stirring for 6 hours.

By isolating the pigment from the aforementioned microcapsule pigment suspension by centrifugation, a thermochromic coloring color-memory microcapsule pigment having an average particle diameter of 4 μm which changes color from blue to colorless was obtained.

Example 5

A thermochromic coloring color-memory microcapsule pigment suspension was obtained by uniformly heat-dissolving a thermochromic coloring color-memory composition comprising 2.0 parts of 3-(4-diethylamino-2-hexyloxyphenyl)-3-(1-ethyl-2-methyl-indol-3-yl)-4-azaphthalide as the component (A), 4.0 parts of 2,2-bis(4'-hydroxyphenyl) hexafluoropropane and 4.0 parts of 1,1-bis(4'-hydroxyphenyl)-n-decane as the component (B) and 50.0 parts of 4-benzyloxyphenylethyl caprate as the component (C), emulsifying and dispersing a solution prepared as a wall membrane material by mixing 30.0 parts of an aromatic polyvalent isocyanate prepolymer with 40.0 parts of a co-solvent such that micro-droplets were formed in 8% polyvinyl alcohol aqueous solution, continuing the stirring at 70° C. for about 1 hour, and then adding 2.5 parts of a water-soluble aliphatic denatured amine and further continuing the stirring for 6 hours.

By isolating the pigment from the aforementioned microcapsule pigment suspension by centrifugation, a thermochromic coloring color-memory microcapsule pigment having an average particle diameter of 3 μm which changes color from blue to colorless was obtained.

Example 6

A thermochromic coloring color-memory microcapsule pigment suspension was obtained by uniformly heat-dissolving a thermochromic coloring color-memory, composition comprising 2.0 parts of 3-(4-diethylamino-2-hexyloxyphenyl)-3-(1-ethyl-2-methyl-indol-3-yl)-4-azaphthalide as the component (A), 4.0 parts of 2,2-bis(4'-hydroxyphenyl) hexafluoropropane and 4.0 parts of 1,1-bis(4'-hydroxyphenyl)-n-decane as the component (B) and 50.0 parts of 4-benzyloxyphenylethyl caprylate as the component (C), emulsifying and dispersing a solution prepared as a wall membrane material by mixing 30.0 parts of an aromatic polyvalent isocyanate prepolymer with 40.0 parts of a co-solvent such that micro-droplets were formed in 8% polyvinyl alcohol aqueous solution, continuing the stirring at 70° C. for about 1 hour, and then adding 2.5 parts of a water-soluble aliphatic denatured amine and further continuing the stirring for 6 hours.

By isolating the pigment from the aforementioned microcapsule pigment suspension by centrifugation, a thermochromic coloring color-memory microcapsule pigment having an average particle diameter of 3 μm which changes color from blue to colorless was obtained.

Example 7

A thermochromic coloring color-memory microcapsule pigment suspension was obtained by uniformly heat-dissolving a thermochromic coloring color-memory composition comprising 5.0 parts of 2-(2-chloroanilino)-6-di-n-butylaminofluoran as the component (A), 5.0 parts of 2,2-bis(4'-hydroxyphenyl)hexafluoropropane and 10.0 parts of 1,1-bis(4'-hydroxyphenyl)-n-decane as the component (B) and 50.0 parts of 4-benzyloxyphenylethyl caprate as the component (C), emulsifying and dispersing a solution prepared as a wall membrane material by mixing 30.0 parts of an aromatic polyvalent isocyanate prepolymer with 40.0 parts of a co-solvent such that micro-droplets were formed in 8% polyvinyl alcohol aqueous solution, continuing the stirring at 70° C. for about 1 hour, and then adding 2.5 parts of a water-soluble aliphatic denatured amine and further continuing the stirring for 6 hours.

By isolating the pigment from the aforementioned microcapsule pigment suspension by centrifugation, a thermochromic coloring color-memory microcapsule pigment having an average particle diameter of 2 μm which changes color from black to colorless was obtained.

Example 8

A thermochromic coloring color-memory microcapsule pigment suspension was obtained by uniformly heat-dissolving a thermochromic coloring color-memory composition comprising 2.3 parts of 1,3-dimethyl-6-diethylaminofluoran and 0.7 part of 1,2-benz-6-(N-ethyl-N-isobutylamino)fluoran as the component (A), 5.0 parts of 2,2-bis (4'-hydroxyphenyl) hexafluoropropane and 10.0 parts of 1,1-bis(4'-hydroxyphenyl)-n-decane as the component (B) and 50.0 parts of 4-benzyloxyphenylethyl caprate as the component (C), emulsifying and dispersing a solution prepared as a wall membrane material by mixing 30.0 parts of an aromatic polyvalent isocyanate prepolymer with 40.0 parts of a co-solvent such that micro-droplets were formed in 8% polyvinyl alcohol aqueous solution, continuing the stirring at 70° C. for about 1 hour, and then adding 2.5 parts of a water-soluble aliphatic denatured amine and further continuing the stirring for 6 hours.

By isolating the pigment from the aforementioned microcapsule pigment suspension by centrifugation, a thermochromic coloring color-memory microcapsule pigment having an average particle diameter of 2 μm which changes color from red to colorless was obtained.

Example 9

A thermochromic coloring color-memory microcapsule pigment suspension was obtained by uniformly heat-dissolving a thermochromic coloring color-memory composition comprising 2.0 parts of 2-(butylamino)-8-(diphenylamino)-4-methylspiro[5H-(1)-benzopyrano[2-3-g]pyrimidine-5,1 (3'H)-benzofuran]-3-one as the component (A), 10.0 parts of 5,5'-(1-methylethylidene)bis[1-phenyl-2-ol] as the component (B) and 50.0 parts of 4-benzyloxyphenylethyl caprate as the component (C), emulsifying and dispersing a solution prepared as a wall membrane material by mixing 30.0 parts of an aromatic polyvalent isocyanate prepolymer with 40.0 parts of a co-solvent such that micro-droplets were formed in 8% polyvinyl alcohol aqueous solution, continuing the stirring at 70° C. for about 1 hour, and then adding 2.5 parts of a water-soluble aliphatic denatured amine and further continuing the stirring for 6 hours.

By isolating the pigment from the aforementioned microcapsule pigment suspension by centrifugation, a thermochromic coloring color-memory microcapsule pigment having an average particle diameter of 5 μm which changes color from pink to colorless was obtained.

Example 10

A thermochromic coloring color-memory microcapsule pigment suspension was obtained by uniformly heat-dissolving a thermochromic coloring color-memory composition comprising 2.0 parts of 2-(butylamino)-8-(diphenylamino)-4-methylspiro[5H-(1)-benzopyrano[2-3-g]pyrimidine-5,1 (3'H)-benzofuran]-3-one as the component (A), 8.0 parts of 4,4'-[1-[4-[1-(4-hydroxy-3-methylphenyl)-1-methylphenyl]-ethylidene]bis[2-methylphenol]] as the component (B) and 50.0 parts of 4-benzyloxyphenylethyl caprate as the component (C), emulsifying and dispersing a solution prepared as a wall membrane material by mixing 30.0 parts of an aromatic polyvalent isocyanate prepolymer with 40.0 parts of a co-solvent such that micro-droplets were formed in 8% polyvinyl alcohol aqueous solution, continuing the stirring at 70° C. for about 1 hour, and then adding 2.5 parts of a water-soluble aliphatic denatured amine and further continuing the stirring for 6 hours.

By isolating the pigment from the aforementioned microcapsule pigment suspension by centrifugation, a thermochromic coloring color-memory microcapsule pigment having an average particle diameter of 3 μm which changes color from pink to colorless was obtained.

Example 11

A thermochromic coloring color-memory microcapsule pigment suspension was obtained by uniformly heat-dissolving a thermochromic coloring color-memory composition comprising 2.0 parts of 2-(butylamino)-8-(diphenylamino)-4-methylspiro[5H-(1)-benzopyrano[2-3-g]pyrimidine-5,1 (3'H)-benzofuran]-3-one as the component (A), 8.0 parts of bis (3-methyl-4-hydroxyphenyl) sulfide as the component (B) and 50.0 parts of 4-benzyloxyphenylethyl caprate as the component (C), emulsifying and dispersing a solution prepared as a wall membrane material by mixing 30.0 parts of an aromatic polyvalent isocyanate prepolymer with 40.0 parts of a co-solvent such that micro-droplets were formed in 8% polyvinyl alcohol aqueous solution, continuing the stirring at 70° C. for about 1 hour, and then adding 2.5 parts of a water-soluble aliphatic denatured amine and further continuing the stirring for 6 hours.

By isolating the pigment from the aforementioned microcapsule pigment suspension by centrifugation, a thermochromic coloring color-memory microcapsule pigment having an average particle diameter of 2 μm which changes color from pink to colorless was obtained.

Preparation of Measuring Sample

After dissolving 30 parts of the thermochromic coloring color-memory composition of Example 1 in methyl ethyl ketone, a filter paper (No. 2 filter paper, mfd. by Toyo Roshi Kaisha) was impregnated with the solution to obtain a measuring sample.

Using a reversible thermal discoloration ink prepared by dispersing 40 parts of each of the microcapsule pigment of Examples 2 to 10 in ethylene-vinyl acetate emulsion, a circle of a predetermined size (reversible thermal discoloration layer) was printed on a sheet of wood-free paper by screen printing, thereby obtaining respective test samples.

Each of the thus obtained test samples was heated and cooled by the following method, and the discoloration behavior was plotted on a graph.

Measurement of Discoloring Temperature

The aforementioned measuring sample was set on a predetermined position of a color-difference meter (TC-3600 Color-Difference Meter, mfd. by Tokyo Denshoku), and the color density at each temperature was measured by heating and cooling at a rate of 10° C./min with a temperature width of 100° C.

For example, in the case of Example 1, the sample was heated up to 80° C. at a rate of 10° C./min starting at −20° C. as the measurement starting temperature, and then again cooled down to −20° C. at a rate of 10° C./min. The lightness value at each temperature displayed on the color-difference meter was plotted on a graph to prepare the color density-temperature curve exemplified in FIG. 1, and each of the values of $T_1$, $T_2$, $T_3$, $T_4$, $T_H$, $T_G$ and $\Delta H$ (line segment HG) was obtained.

The following table shows $T_1$ (complete coloring temperature), $T_2$ (coloring starting temperature), $T_3$ (decoloring starting temperature), $T_4$ (complete decoloring temperature) $T_H$ (temperature of middle point between $T_1$ and $T_2$; $T_1+T_2/2$), $T_G$ (temperature of middle point between $T_3$ and $T_4$; $T_3+T_4/2$) and $\Delta H$ (maximum hysteresis width; $T_G-T_H$) of the thermochromic coloring color-memory composition and thermochromic coloring color-memory microcapsule pigment used in each test sample.

TABLE 1

| | Thermal discoloration temperature characteristics | | | | | | |
|---|---|---|---|---|---|---|---|
| Example | $T_1$ | $T_2$ | $T_3$ | $T_4$ | $T_H$ | $T_G$ | $\Delta H$ |
| 1 | −10.0 | 0.0 | 45.0 | 65.0 | −5.0 | 55.0 | 60.0 |
| 2 | 15.0 | 30.0 | 59.0 | 78.0 | 22.5 | 68.5 | 46.0 |
| 3 | 16.0 | 22.0 | 63.0 | 75.0 | 19.0 | 69.0 | 50.0 |
| 4 | −2.0 | 6.0 | 56.0 | 70.0 | 2.0 | 63.0 | 61.0 |
| 5 | −14.0 | −6.0 | 48.0 | 62.0 | −10.0 | 55.0 | 65.0 |
| 6 | −24.0 | −10.0 | 42.0 | 55.0 | −17.0 | 48.5 | 65.5 |
| 7 | −22.0 | −14.0 | 40.0 | 58.0 | −18.0 | 49.0 | 67.0 |
| 8 | −20.0 | −12.0 | 36.0 | 60.0 | −16.0 | 48.0 | 64.0 |
| 9 | −14.0 | −6.0 | 32.0 | 58.0 | −10.0 | 45.0 | 55.0 |
| 10 | −20.0 | −8.0 | 35.0 | 56.0 | −14.0 | 45.5 | 59.5 |
| 11 | −14.0 | −9.0 | 43.0 | 61.0 | −11.5 | 52.0 | 63.5 |

Application Example 1

A reversible discoloration layer was arranged on the surface of a white polyester film (25 μm in thickness) used as the support, by printing it using an ink prepared by dispersing the thermochromic coloring color-memory microcapsule pigment prepared in Example 5 in a vehicle containing a binder resin, and the upper side thereof was laminate-treated with a transparent polyester film of 16 μm in thickness to obtain a reversible thermal discoloration display.

The aforementioned display was once cooled to 14° C. or lower to effect color development of the reversible discoloration layer into a completely blue state, and then a white reverse letter was formed by printing it using a thermal transfer printer (product number: S4870, mfd. by Showa Information Systems).

The aforementioned white reverse letter can be observed with the naked eye so long as the aforementioned display is kept at a temperature of from −6° C. to 48° C.

Also, the white reverse letter became invisible when the aforementioned display was again cooled to −14° C. or lower thereby allowing the discoloration layer to develop a color of completely blue state, so that it was able to use the display repeatedly again and again by forming the white reverse letter using the aforementioned thermal transfer printer.

Application Example 2

Preparation of Reversible Thermal Discoloration Ink

A reversible thermal discoloration ink comprising 5.5 parts of the thermochromic coloring color-memory microcapsule pigment prepared in Example 7, 0.33 part of xanthan gum (an agent for providing shearing viscosity reduction), 10 parts of urea, 10 parts of glycerin, 0.6 part of a nonionic system permeability providing agent (trade name: Nopco SW-WET-366, mfd. by San Nopco), 0.1 part of a modified silicone system antifoaming agent (trade name: Nopco 8034, mfd. by San Nopco), 0.1 part of an anti-fungal agent (trade name: Proxel XL-2, mfd. by Zeneca) and 73.37 parts of water was prepared.

Preparation of Writing Implement

A polypropylene pipe having an inner diameter of 4.4 mm was filled by suction with 0.97 g of the aforementioned ink (after allowing the microcapsule pigment to develop color by cooling to −22° C. or lower in advance and then to stand at room temperature) and connected with a ball-point pen tip holding a 0.7 mm steel ball inside the tip, via a holder made of a resin.

Next, in ink backflow-preventing matter (liquid plug) containing polybutene as the main component and having viscoelasticity was filled from the rear part of the aforementioned polypropylene pipe, the rear part of the pipe was further interlocked with a tail plug, a front axle body and a rear axle body were assembled, a cap was fitted, and then degassing treatment was carried out by centrifugation, thereby obtaining a reversible thermal discoloration ball-point pen.

In this connection, the apex of the aforementioned cap is mounted with a silicone rubber as a frictional body.

Using the aforementioned ball-point pen, a blue letter (handwriting) was formed by writing on a sheet of paper.

The aforementioned handwriting was black at room temperature (25° C.), but the letter discolored and became colorless when the letter was erased using the frictional body, and it was able to keep this state unless cooling to −22° C. or lower.

Meanwhile, in the aforementioned area wherein the letters on the paper surface had been decolored, different letters could be written down by using the aforementioned ball-point pen.

Moreover, in the area wherein the aforementioned letters on the paper surface were decolored, blue-colored letters can be written down by using a ball-point pen charged with the thermochromic coloring color-memory microcapsule pigment described in Example 6.

Application Example 3

Preparation of Reversible Thermal Discoloration Ink

A reversible thermal discoloration ink comprising 5.5 parts of the thermochromic coloring color-memory microcapsule pigment prepared in Example 11, 0.5 part of a blue dyestuff (C.I. 42090, mfd. by Aizen Hodogaya), 0.33 part of succinoglycan (an agent for providing shearing viscosity reduction), 10 parts of urea, 10 parts of glycerin, 0.6 part of a nonionic system permeability providing agent (trade name; Nopco SW-WET-366, mfd. by San Nopco), 0.1 part of a modified silicone system antifoaming agent (trade name: Nopco 8034, mfd. by San Nopco), 0.1 part of an anti-fungal agent (trade name: Proxel XL-2, mfd. by Zeneca) and 72.87 parts of water was prepared.

Preparation of Writing Implement

A polypropylene pipe having an inner diameter of 4.4 mm was filled by suction with 0.97 g of the aforementioned ink (after allowing the microcapsule pigment to develop color by cooling to −14° C. or less in advance and then to stand at room temperature) and connected with a ball-point pen tip holding a 0.7 mm steel ball inside the tip, via a holder made of a resin.

Next, in ink backflow-preventing matter (liquid plug) containing polybutene as the main component and having viscoelasticity was filled from the rear part of the aforementioned polypropylene pipe, the rear part of the pipe was further interlocked with a tail plug, a front axle body and a rear axle body were assembled, a cap was fitted, and then degassing treatment was carried out by centrifugation, thereby obtaining a reversible thermal discoloration ball-point pen.

In this connection, the apex of the aforementioned cap is mounted with a silicone rubber as a frictional body.

Using the aforementioned ball-point pen, a purple letter (handwriting) was formed by writing on a sheet of paper.

The aforementioned handwriting was purple at room temperature (25° C.), but the letter discolored and became blue when the letter was erased using the frictional body, and it was able to keep this state unless cooling to −22° C. or less.

In this connection, when the aforementioned sheet pf paper was cooled to −22° C. or lower by putting into a refrigerator, the letter showed a discoloration behavior of again changing to purple, and the aforementioned discoloration behavior was able to be reproduced repeatedly.

Application Example 4

Preparation of Reversible Thermal Discoloration Ink

A reversible thermal discoloration ink in which the aforementioned microcapsule pigment was suspended in a mildly aggregated state was prepared by making an aqueous medium comprising 5.5 parts of the thermochromic coloring color-memory microcapsule pigment prepared in Example 8, 5.0 parts of glycerin, 0.7 part of an anti-fungal agent (trade name: Proxel XL-2, mfd. by Zeneca) 0.7 part of a silicone system antifoaming agent (trade name: SN Defoamer 381, mfd. by San Nopco) and 80.7 parts of water, into a uniformly dispersed state, and then adding 8.0 parts of an aqueous solution containing 5.0 parts of hydroxyethyl cellulose (a water-soluble polymer aggregation agent, trade name: Cellosize, mfd. by Union Carbide Japan) to the aforementioned solution under a dispersed state while stirring.

Preparation of Writing Implement

A fiber focusing ink occlusion body (porosity, about 80%) prepared by coating a polyester sliver with a synthetic resin film was impregnated with the aforementioned reversible thermal discoloration ink (after allowing the microcapsule pigment to develop color by cooling to −20° C. or less in advance and then to stand at room temperature), contained in an axle tube and assembled in such a manner that it contacted with a resin processed pen body of polyester fiber (porosity, about 50%) mounted on the front part of the axle tube, and then a cap was fitted thereto, thus obtaining a water paint marking pen.

In this connection, the apex of the aforementioned cap is mounted with a silicone rubber as a frictional body.

By drawing a line using the aforementioned marking pen on a letter printed on a sheet of paper, it was able to modify the letter in red.

The aforementioned modified part of the letter was red at room temperature (25° C.), but the modified part discolored and became colorless when erased using the frictional body, and it was able to keep this state unless cooling to −22° C. or lower.

In this connection, when the aforementioned sheet pf paper was cooled to −22° C. or lower by putting in to a refrigerator, the modified part showed a discoloration behavior of again changing to red, and the aforementioned discoloration behavior was able to be reproduced repeatedly.

Application Example 5

In a similar manner, a ball-point pen was prepared by using the reversible thermal discoloration ink prepared in Application Example 2 (after allowing the microcapsule pigment to lose color by heating to 58° C. or higher in advance and then to stand at room temperature).

When writing in a paper surface is conducted with use of the ballpoint pen thus prepared, the handwriting was not visually recognized due to its colorless nature. But by cooling the paper to −22° C. or less, the handwriting turned black by color development, and this colored state could be maintained unless the paper is heated to 58° C. or higher.

By way of precaution, when the aforementioned paper surface was heated to 58° C. or higher, a discoloration behavior that the letters turned colorless again was observed. Such discoloration behavior could be reproduced repeatedly.

What is claimed is:

1. A thermochromic coloring color-memory composition comprising a homogeneous solubilized mixture of (A) an electron donative coloring organic compound, (B) an electron accepting compound and (C) an ester compound represented by the following formula (1) as a reaction medium which controls color reactions of the components (A) and (B):

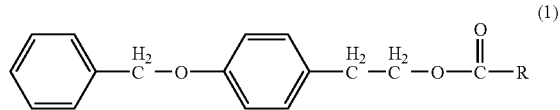

(1)

wherein R represents an alkyl group or an alkenyl group, having 4 or more carbon atoms, and wherein a complete decoloring temperature, T4, is 40° C. or higher and a coloring starting temperature, T2, is 20° C. or lower regarding the color density-temperature curve, and wherein said composition has color-memory ability at the ordinary temperature range.

2. The thermochromic coloring color-memory composition according to claim 1, wherein the component (B) is a compound which has at least 3 or more benzene rings, has a phenolic hydroxyl group, and has a molecular weight of 250 or more.

3. A thermochromic coloring color-memory microcapsule pigment comprising the thermochromic coloring color-memory composition of claim 1 or 2.

4. An ink composition for a writing implement, which comprises the thermochromic coloring color-memory microcapsule pigment according to claim 3.

5. A writing implement which comprises the ink composition for a writing implement according to claim 4.

6. The writing implement according to claim 4, which comprises a frictional body.

7. The thermochromic coloring color-memory composition according to claim 1 or 2, which shows a maximum hysteresis width, ΔH, of from 40° C. to 70° C. regarding a color density-temperature curve.

* * * * *